United States Patent
Kiyokami et al.

(10) Patent No.: US 10,309,524 B2
(45) Date of Patent: Jun. 4, 2019

(54) LUBRICATING DEVICE OF POWER TRANSMISSION DEVICE FOR VEHICLE

(71) Applicant: TOYOTA JIDOSHA KABUSHIKI KAISHA, Toyota-shi, Aichi-ken (JP)

(72) Inventors: Hiroaki Kiyokami, Toyota (JP); Yoshinori Morita, Toyota (JP); Shingo Kato, Toyota (JP); Yukinobu Nishikawa, Anjo (JP); Tetsuo Hori, Toyota (JP); Hakuba Okuno, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 270 days.

(21) Appl. No.: 15/412,940

(22) Filed: Jan. 23, 2017

(65) Prior Publication Data

US 2017/0219085 A1    Aug. 3, 2017

(30) Foreign Application Priority Data

Feb. 3, 2016 (JP) ................................. 2016-019333
Aug. 12, 2016 (JP) ................................. 2016-159011

(51) Int. Cl.
*F16H 57/04* (2010.01)
*F01M 1/02* (2006.01)
(Continued)

(52) U.S. Cl.
CPC ......... *F16H 57/0475* (2013.01); *B60K 6/445* (2013.01); *B60R 17/02* (2013.01);
(Continued)

(58) Field of Classification Search
CPC ............. F16H 57/0475; F16H 57/0436; F16H 57/0441; F16H 57/0447; F16H 57/045;
(Continued)

(56) References Cited

U.S. PATENT DOCUMENTS 4,736,819 A * 4/1988 Muller ................ F16H 57/0447
                                              123/196 AB
5,662,188 A    9/1997 Ito et al.
(Continued)

FOREIGN PATENT DOCUMENTS

JP    H06-213308 A    8/1994
JP    H08-105520 A    4/1996
(Continued)

*Primary Examiner* — Michael R Mansen
*Assistant Examiner* — Robert T Reese
(74) *Attorney, Agent, or Firm* — Oliff PLC (57) ABSTRACT

During the travel of a vehicle, the oil level of lubricating oil is lowered due to the suction by at least a first oil pump and the scraping-up by the rotation of a differential ring gear and so on. In particular, until the oil level becomes equal to or lower than an upper end of a first partition wall, the oil level is lowered due to both the suction by the first oil pump and the scraping-up by the rotation of the differential ring gear and so on, and therefore, a region, that is immersed in the lubricating oil, of the differential device rapidly becomes smaller. Since a suction port of the first oil pump is disposed in a second oil storage portion, the oil level in the second oil storage portion during the travel of the vehicle can be adjusted independently of that in a first oil storage portion.

4 Claims, 9 Drawing Sheets (51) Int. Cl.
*F01M 11/06* (2006.01)
*B60R 17/02* (2006.01)
*B60K 6/445* (2007.10)

(52) U.S. Cl.
CPC ............ *F01M 1/02* (2013.01); *F01M 11/064* (2013.01); *F16H 57/045* (2013.01); *F16H 57/0436* (2013.01); *F16H 57/0441* (2013.01); *F16H 57/0447* (2013.01); *F16H 57/0476* (2013.01); *F16H 57/0483* (2013.01); *B60Y 2200/92* (2013.01); *B60Y 2306/03* (2013.01)

(58) Field of Classification Search
CPC ... F16H 57/0476; F16H 57/0483; F01M 1/02; F01M 11/064; B60K 6/445; B60R 17/02
See application file for complete search history.

(56) References Cited

U.S. PATENT DOCUMENTS

| | | | | |
|---|---|---|---|---|
| 6,217,758 | B1* | 4/2001 | Lee | F01M 11/0004 210/167.06 |
| 6,299,561 | B1* | 10/2001 | Kramer | F16H 57/0447 184/13.1 |
| 2002/0053489 | A1* | 5/2002 | Schnitzer | F01M 1/02 184/6.12 |
| 2004/0154846 | A1 | 8/2004 | Kira | |
| 2008/0073153 | A1* | 3/2008 | Fujimoto | F01M 1/02 184/6.28 |
| 2009/0057061 | A1* | 3/2009 | Bonning | F16H 57/0436 184/6.12 |
| 2011/0041649 | A1* | 2/2011 | Iwata | F16H 57/0447 74/606 R |
| 2013/0145879 | A1* | 6/2013 | Nakamura | F16H 57/042 74/467 |
| 2014/0262675 | A1* | 9/2014 | Sugiyama | F16H 57/0445 192/85.01 |
| 2015/0323059 | A1* | 11/2015 | Pritchard | F16H 57/0456 184/15.1 |
| 2016/0091080 | A1* | 3/2016 | Craft | F16H 57/046 184/6.12 |
| 2016/0369853 | A1 | 12/2016 | Sugiura et al. | |
| 2017/0350498 | A1* | 12/2017 | Muto | F16H 57/04 |

FOREIGN PATENT DOCUMENTS

| | | |
|---|---|---|
| JP | 2004-180477 A | 6/2004 |
| JP | 2006-213308 A | 8/2006 |
| JP | 2008-105520 A | 5/2008 |
| JP | 2009-222161 A | 10/2009 |
| JP | 2011-027142 A | 2/2011 |
| JP | 2012-106599 A | 6/2012 |
| JP | 2014-047826 A | 3/2014 |
| JP | 2014-180965 A | 9/2014 |
| JP | 2014-240680 A | 12/2014 |
| WO | 2015/152130 A1 | 10/2015 |

* cited by examiner

| TRAVEL MODE | ENGINE 20 | MG1 | MG2 | P1 | P2 |
|---|---|---|---|---|---|
| EV TRAVEL | ROTATION STOPPED | FREE | POWER RUNNING | ROTATED | STOPPED |
| HV TRAVEL | DRIVEN | REGENERATIVE | FREE (POWER RUNNING) | ROTATED | ROTATED |

| TRAVEL MODE | ENGINE 20 | MG1 | MG2 | P1 | P2 |
|---|---|---|---|---|---|
| FREE-RUN INERTIA TRAVEL | ROTATION STOPPED | FREE | FREE | ROTATED | STOPPED |
| DECELERATION ECONOMIC-RUN TRAVEL | ROTATION STOPPED | FREE | REGENERATIVE | ROTATED | STOPPED |

FIG. 11

LUBRICATING DEVICE OF POWER TRANSMISSION DEVICE FOR VEHICLE

INCORPORATION BY REFERENCE

The disclosure of Japanese Patent Applications No. 2016-019333 filed on Feb. 3, 2016 and No. 2016-159011 filed on Aug. 12, 2016 including the specification, drawings and abstract is incorporated herein by reference in its entirety.

BACKGROUND

1. Technical Field

The present disclosure relates to a lubricating device of a power transmission device for a vehicle and, in particular, relates to a technique that reduces the energy loss due to agitation or the like of lubricating oil that is caused by the rotation of an output portion.

2. Description of Related Art

With respect to a vehicle power transmission device that is housed in a case and transmits a driving force from a driving force source to drive wheels via an output portion, there has been proposed a lubricating device configured such that lubricating oil in an oil storage portion provided at the bottom of the case is sucked by a suction device and supplied to respective portions of the power transmission device and that the oil storage portion is divided into a first oil storage portion at a position below the output portion and the other portion by a partition wall. A device described in Japanese Patent Application Publication No. 2011-27142 (JP 2011-27142 A) is its one example in which the oil level of lubricating oil is lowered due to the suction of the lubricating oil in a first oil storage portion by a suction device, so that the mechanical energy loss due to the agitation of the lubricating oil by the rotation of an output portion is reduced. On the other hand, Japanese Patent Application Publication No. 2012-106599 (JP 2012-106599 A) describes a technique that uses as a suction device an oil pump that is rotationally driven mechanically by the rotation of an output portion of a power transmission device. It is to be noted that "lubrication" in this specification includes not only preventing friction and wear, but also supplying lubricating oil to, for example, an electric motor to cool it.

SUMMARY

However, in such a conventional lubricating device, if it is configured that the oil level in the first oil storage portion is lowered for reducing the energy loss due to the agitation of the lubricating oil by the rotation of the output portion, it is structurally difficult to sufficiently ensure the depth of the lubricating oil due to the need to consider ensuring the minimum ground clearance and so on. Accordingly, there is a possibility that if it is configured that the oil level in the first oil storage portion is lowered, a suction port of the oil pump may be exposed above the oil surface to cause the occurrence of suction of air by the oil pump, i.e. so-called air suction, so that the lubricating oil cannot be supplied sufficiently. If the suction performance (suction amount for each rotation) of the oil pump and so on are set so as to increase the depth of the lubricating oil in the first oil storage portion for preventing air suction, a region, that is immersed in the lubricating oil, of the output portion becomes larger, so that the energy loss due to the agitation of the lubricating oil increases.

The present disclosure has been made in view of these circumstances and provides a lubricating device of a power transmission device for a vehicle, that is configured to reduce the mechanical energy loss due to agitation of lubricating oil while suppressing air suction of an oil pump.

Therefore, according to one aspect of the present disclosure, there is provided a lubricating device of a power transmission device for a vehicle, including an oil storage portion and a suction device. The oil storage portion is provided at a bottom portion in a case of the power transmission device configured to transmit a driving force from a driving force source of the vehicle to a drive wheel of the vehicle, the oil storage portion is configured to store lubricating oil, and the oil storage portion includes a first oil storage portion and an oil storage portion other than the first oil storage portion defined by a first partition wall, the first oil storage portion being located below an output portion of the power transmission device. The suction device is configured to suck the lubricating oil and to supply the lubricating oil to respective portions of the power transmission device. The suction device includes a first oil pump. The first oil pump is configured to be rotationally driven mechanically by rotation of the output portion and sucks the lubricating oil. Further, (i) a height of the first partition wall is set to be lower than a stationary oil level of the lubricating oil in a stationary state in which flow of the lubricating oil is stopped. (ii) A height position of a lower end of the output portion is lower than an upper end position of the first partition wall, and the output portion is at least partially immersed in the lubricating oil in the stationary state. (iii) A suction port of the first oil pump is disposed in the oil storage portion other than the first oil storage portion in the oil storage portion. (iv) During travel of the vehicle, an oil level in the first oil storage portion is caused to be located below the upper end position of the first partition wall, by a fact that the lubricating oil in the first oil storage portion is scraped up by the rotation of the output portion, and the lubricating oil in the oil storage portion other than the first oil storage portion is sucked by the first oil pump.

According to the structure of the lubricating device of the power transmission device for the vehicle described above, in the stationary state such as during the stop of the vehicle in which the first oil pump is stopped, the stationary oil level is higher than the first partition wall, so that the output portion is at least partially immersed in the lubricating oil. Therefore, the lubricating oil is scraped up by the rotation of the output portion at the time of start of the vehicle, so that the lubricating oil is scattered to the respective portions of the power transmission device. Consequently, it is possible to ensure a good lubrication state at the time of start of the vehicle at which it is difficult to supply a sufficient amount of the lubricating oil by the first oil pump.

On the other hand, during the travel of the vehicle, the oil level of the lubricating oil is lowered due to the suction by the first oil pump and the scraping-up by the rotation of the output portion. Then, when the oil level becomes equal to or lower than the upper end of the first partition wall, the lubricating oil in the portion other than the first oil storage portion is sucked by the first oil pump, and the oil level in the first oil storage portion is further lowered due to the scraping-up by the rotation of the output portion, so that the oil level in the first oil storage portion is located below the upper end position of the first partition wall regardless of the return of the lubricating oil from the lubricating portions. Therefore, the mechanical energy loss due to the agitation of the lubricating oil by the rotation of the output portion is reduced. In particular, until the oil level becomes equal to or lower than the upper end of the first partition wall, the oil level is lowered due to both the suction by the first oil pump and the scraping-up by the rotation of the output portion, and therefore, a region, that is immersed in the lubricating oil, of the output portion rapidly becomes smaller, so that the energy loss due to the agitation of the lubricating oil is properly reduced.

Since the suction port of the first oil pump is disposed in the portion other than the first oil storage portion, the oil level during the travel of the vehicle can be adjusted independently of that in the first oil storage portion by the suction performance of the first oil pump, the region of the portion other than the first oil storage portion, and so on. Consequently, the oil level can be adjusted so as to suppress air suction of the first oil pump, so that it is possible to properly prevent short supply of the lubricating oil due to air suction, thereby stably supplying the lubricating oil. That is, since the oil storage portion is divided by the partition wall, the oil level in the first oil storage portion is preferentially lowered while ensuring a necessary and sufficient amount of the lubricating oil in the portion other than the first oil storage portion. Consequently, the energy loss due to the agitation of the lubricating oil by the rotation of the output portion can be properly reduced.

In the lubricating device of the power transmission device for the vehicle described above, the suction device may include a second oil pump separately from the first oil pump. The second oil pump may be configured to be rotationally driven by a rotary drive source that is different from the output portion, and a suction port of the second oil pump may be disposed in the oil storage portion other than the first oil storage portion in the oil storage portion.

According to the structure of the lubricating device of the power transmission device for the vehicle described above, since the second oil pump is provided separately from the first oil pump, it is possible to compensate for shortage of the lubricating oil supply amount. Further, depending on the different drive source, it is possible to lubricate the respective portions in a lubricating oil supply amount not depending on a vehicle speed. Since the suction port of the second oil pump is disposed in the oil storage portion other than the first oil storage portion, it is possible to prevent air suction and thus to stably supply the lubricating oil by setting the suction performance and so on so as to prevent the occurrence of air suction of the second oil pump.

In the lubricating device of the power transmission device for the vehicle described above, the oil storage portion may be defined by the first partition wall so as to provide the first oil storage portion and the oil storage portion may be provided with a second partition wall that further defines the oil storage portion other than the first oil storage portion, the oil storage portion other than the first oil storage portion may have a second oil storage portion adjacent to the first oil storage portion and a third oil storage portion adjacent to the second oil storage portion, and the suction port of the first oil pump and the suction port of the second oil pump may be separately disposed in one and the other of the second oil storage portion and the third oil storage portion.

According to the structure of the lubricating device of the power transmission device for the vehicle described above, since the oil storage portion is further provided with the second partition wall and is divided into the first oil storage portion, the second oil storage portion, and the third oil storage portion, the widths of the second oil storage portion and the third oil storage portion, in which the suction ports of the first oil pump and the second oil pump are disposed, are shortened. Consequently, the bias of the lubricating oil due to a change in posture of the vehicle based on the road surface gradient or the like, acceleration or deceleration, or the like is suppressed, so that the change in oil level in the second oil storage portion and the third oil storage portion decreases. Therefore, air suction of the first oil pump and the second oil pump is suppressed more properly. Since the suction ports are separately disposed in the second oil storage portion and the third oil storage portion, the lubricating oil is sucked from both the oil storage portions, so that it is possible to ensure a sufficient amount of the lubricating oil. Further, the suction performances of the respective oil pumps can be individually set according to required oil supply amounts, return oil amounts to the respective oil storage portions, and so on, so that, for example, the oil levels in the second oil storage portion and the third oil storage portion can be adjusted so as to prevent the occurrence of air suction.

In the lubricating device of the power transmission device for the vehicle described above, a height of the second partition wall may be set to be higher than the height of the first partition wall, the suction port of the first oil pump may be disposed in the second oil storage portion, and the suction port of the second oil pump may be disposed in the third oil storage portion.

According to the structure of the lubricating device of the power transmission device for the vehicle described above, since the height of the second partition wall is higher than that of the first partition wall and the suction port of the first oil pump is disposed in the second oil storage portion, the oil level of the lubricating oil is lowered due to the suction by the first oil pump and the scraping-up by the rotation of the output portion at the time of start of the vehicle. When the oil level is lowered to be equal to or lower than an upper end of the second partition wall, the flow of the lubricating oil from the third oil storage portion to the second oil storage portion side is restricted. Therefore, a decrease in oil level in the second oil storage portion and the first oil storage portion thereafter is promoted, so that the energy loss due to the agitation of the lubricating oil by the rotation of the output portion is rapidly reduced.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

The present disclosure is preferably applied to an engine-driven vehicle or a hybrid vehicle or the like having a travel rotary machine as a travel driving force source in addition to an engine and can also be applied to an electric vehicle or the like having only an electric motor as a driving force source. As the travel rotary machine, a motor generator, for example, is suitable that allows the functions of an electric motor and an electric generator to be selectively used, but an electric motor can alternatively be used. An output portion is, for example, a differential device or the like that outputs to left and right drive wheels a driving force transmitted from the driving force source via a gear mechanism or the like. As a power transmission device, a transverse transaxle such as an FF (front-engine front-drive) transaxle in which a plurality of axes are disposed in a vehicle width direction is preferably used, but it may alternatively be an FR or four-wheel drive power transmission device.

A first supply route that supplies lubricating oil to, for example, respective portions (gears, bearings, rotary machines, etc.) of the power transmission device is connected to the discharge side of a first oil pump that is rotationally driven mechanically by the rotation of the output portion. A second supply route is connected to the discharge side of a second oil pump that is rotationally driven by a rotary drive source different from the output portion. If these supply routes are configured independently of each other, it is possible to lubricate the respective portions of the power transmission device in a shared manner, and further, the suction performances and so on of the respective oil pumps can be individually set according to required oil amounts that are different for the lubricating oil supply portions, so that it is possible to suppress unnecessary lubrication. Further, the lubrication performances and so on can be properly set for the respective supply routes such that, for example, it is possible to separately provide a heat exchanger such as an oil cooler, or an oil storage that stores the lubricating oil. It may be configured that the lubricating oil discharged from the first oil pump and the lubricating oil discharged from the second oil pump join together so as to be supplied to the lubricating portions of the respective portions of the power transmission device via a common supply route.

As the second oil pump, an oil pump that is rotationally driven mechanically by the engine is suitably used, but it is possible to alternatively employ an electric oil pump that is rotationally driven by an electric motor for a pump. An oil storage portion may be divided into three portions in a vehicle longitudinal direction, but may alternatively be divided into only two portions in the vehicle longitudinal direction. The oil storage portion may alternatively be divided in the vehicle width direction. Depending on a structure of the power transmission device, a second oil storage portion and a third oil storage portion may be provided on both sides of a first oil storage portion located below the output portion. In the case where the oil storage portion is divided into two portions, i.e. a first oil storage portion and a second oil storage portion, suction ports of the first oil pump and the second oil pump are both disposed in the second oil storage portion. When the oil level becomes equal to or lower than an upper end of a partition wall, the oil level individually changes in a first oil storage portion, a second oil storage portion, and a third oil storage portion. A communication hole or the like may be provided in the partition wall to allow circulation of the lubricating oil between the adjacent oil storage portions. Even in this case, the oil level individually changes due to the flow resistance by the communication hole.

The suction performances of the first oil pump and the second oil pump are determined as appropriate. For example, while the suction performance of the first oil pump that is rotationally driven during the travel of the vehicle is set to be lower than that of the second oil pump, the suction performances of the oil pumps may be set to be substantially the same or, alternatively, the suction performance of the first oil pump may be set to be higher than that of the second oil pump. The height of a second partition wall may be set to be higher than, equal to, or lower than that of a partition wall that divides the oil storage portion into a first oil storage portion and the other portion.

The first oil pump that is rotationally driven mechanically by the rotation of the output portion may be configured to be rotationally driven constantly by the rotation of the output portion, but may alternatively be configured to be coupled to the output portion via a pump connecting/disconnecting device that connects/disconnects power transmission, and to be coupled to another rotary drive source (an electric motor for a pump, etc.) so as to be rotationally driven. In this case, by disconnecting the power transmission from the output portion and coupling the first oil pump to the other rotary drive source, it is possible to lubricate the respective portions in a lubricating oil supply amount not depending on a vehicle speed, including during the stop of the vehicle.

Hereinbelow, embodiments of the present disclosure will be described in detail with reference to the drawings. In the following embodiments, the figures are simplified or deformed as appropriate for explanation such that the dimensional ratios, shapes, and so on of respective portions are not necessarily accurately shown.

Figure 1:
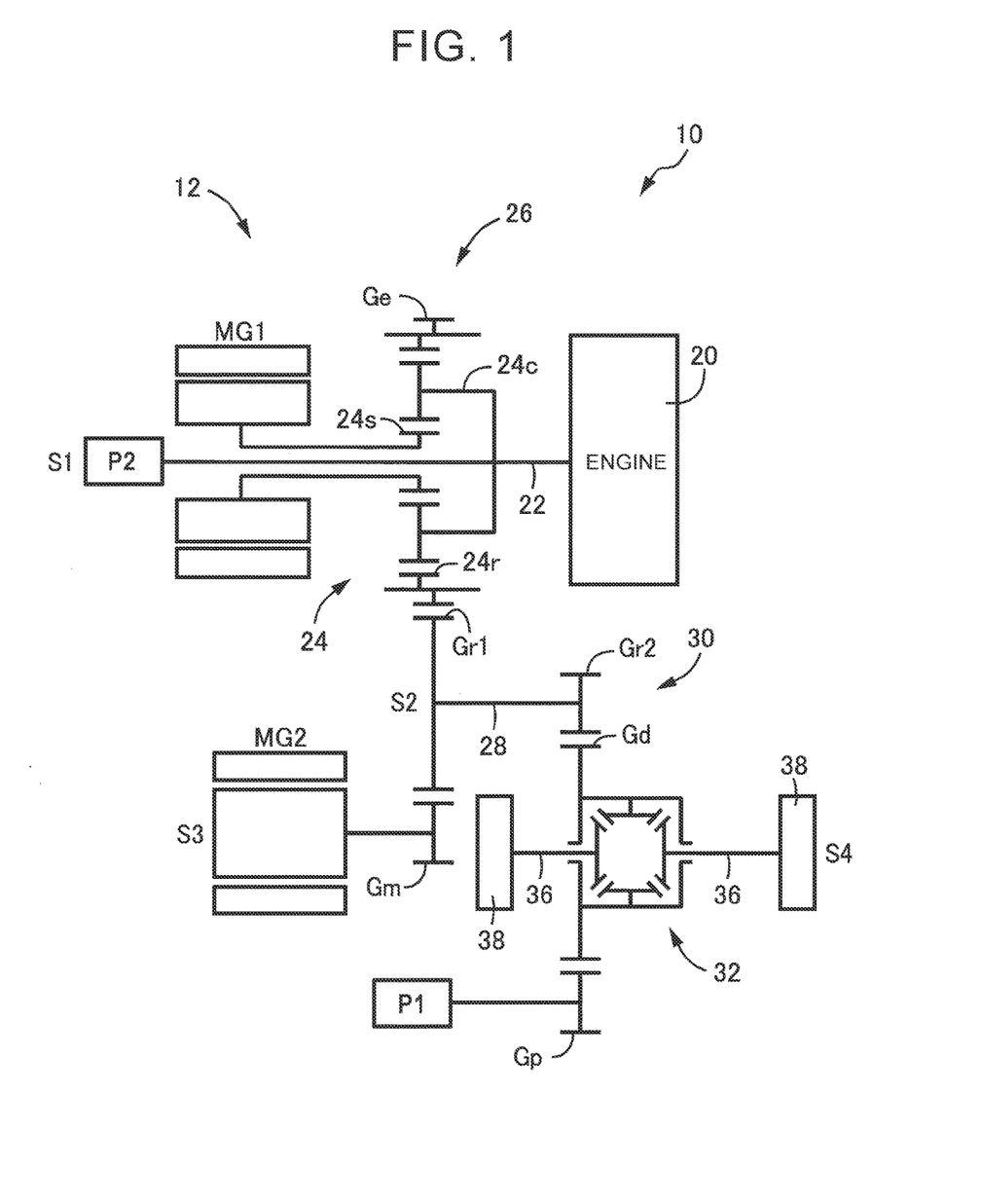
FIG. 1 is a skeleton diagram showing in a developed state a power transmission device of a hybrid vehicle to which a first embodiment of the present disclosure is applied.
Figure 2:
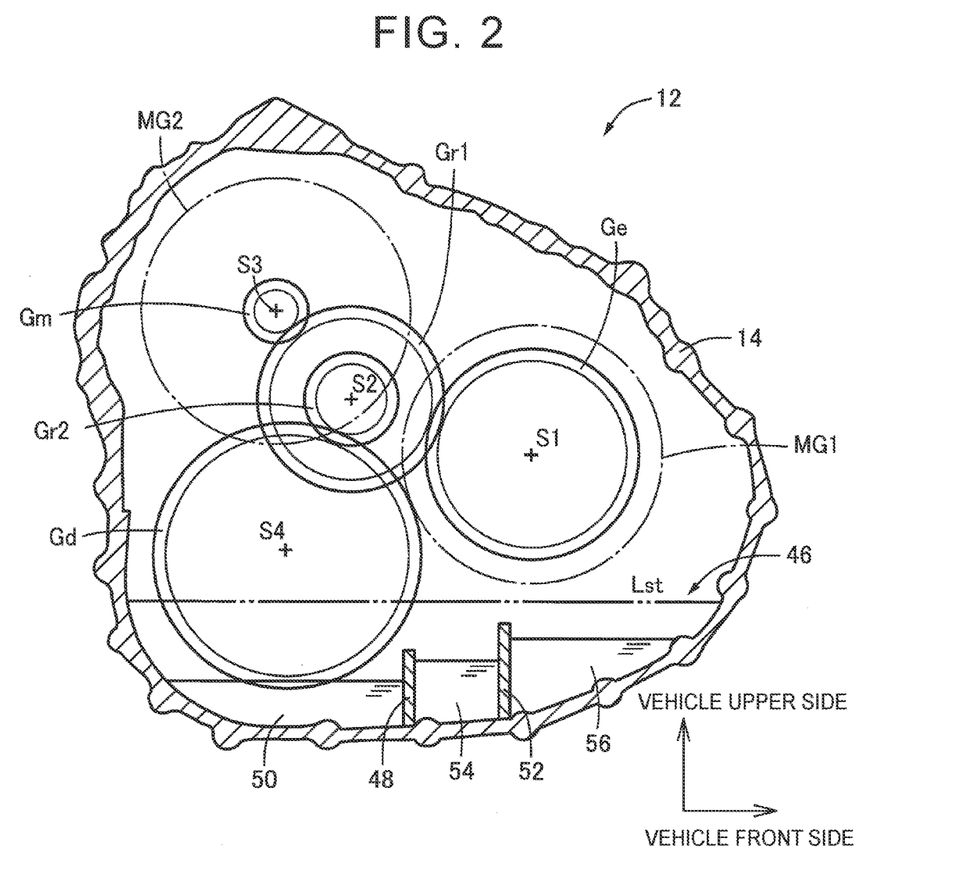
FIG. 2 is a cross-sectional view for explaining a positional relationship among a plurality of axes of the power transmission device of the hybrid vehicle of FIG. 1.

FIG. 1 is a skeleton diagram for explaining a power transmission device 12 of a hybrid vehicle 10 to which a lubricating device of a first embodiment of the present disclosure is applied, and is a developed view showing the power transmission device 12 in a developed state such that a plurality of axes of the power transmission device 12 are located in a common plane, while FIG. 2 is a cross-sectional view showing a positional relationship among the plurality of axes. The power transmission device 12 is a transverse transaxle for a hybrid vehicle such as an FF vehicle in which a plurality of axes are disposed in the vehicle width direction, and is housed in a case 14 shown in FIG. 2. The case 14 is constituted by a plurality of members as needed.

The power transmission device 12 has first to fourth axes S1 to S4 that are substantially parallel to the vehicle width direction. An input shaft 22 coupled to an engine 20 being a driving force source is provided on the first axis S1, and a single-pinion type planetary gear device 24 and a first motor generator MG1 are disposed concentrically with the first axis S1. The planetary gear device 24 and the first motor generator MG1 function as an electric differential portion 26. The input shaft 22 is coupled to a carrier 24c of the planetary gear device 24 being a differential mechanism, the first motor generator MG1 is coupled to a sun gear 24s of the planetary gear device 24, and an engine output gear Ge is provided to a ring gear 24r of the planetary gear device 24. The carrier 24c is a first rotary element. The sun gear 24s is a second rotary element. The ring gear 24r is a third rotary element. The first motor generator MG1 corresponds to a differential-control rotary machine. The first motor generator MG1 is selectively used as an electric motor or as an electric generator. When the rotational speed of the sun gear 24s is continuously controlled in regenerative control or the like in which the first motor generator MG1 functions as the electric generator, the rotational speed of the engine 20 is continuously changed and output from the engine output gear Ge. On the other hand, when the torque of the first motor generator MG1 is set to 0 to idle the sun gear 24s, the co-rotation of the engine 20 is prevented. The engine 20 is an internal combustion engine that generates power by combustion of fuel.

A reduction gear device 30 in which a large-size reduction gear Gr1 and a small-size reduction gear Gr2 are respectively provided at both ends of a shaft 28 is disposed on the second axis S2. The large-size reduction gear Gr1 is in mesh with the engine output gear Ge and also with a motor output gear Gm of a second motor generator MG2 disposed on the third axis S3. The second motor generator MG2 is selectively used as an electric motor or as an electric generator. When the second motor generator MG2 is power-running controlled so as to function as the electric motor, the second motor generator MG2 is used as a travel driving force source of the hybrid vehicle 10. This second motor generator MG2 corresponds to a travel rotary machine.

The small-size reduction gear Gr2 is in mesh with a differential ring gear Gd of a differential device (differential gear set) 32 disposed on the fourth axis S4, so that driving forces from the engine 20 and the second motor generator MG2 are distributed to left and right drive shafts 36 via the differential device 32 so as to be transmitted to left and right drive wheels 38. The differential device 32 corresponds to an output portion, while the differential ring gear Gd corresponds to an input gear. A gear mechanism is constituted by the engine output gear Ge, the large-size reduction gear Gr1, the small-size reduction gear Gr2, the differential ring gear Gd, and so on. As is clear from FIG. 2, the fourth axis S4 is determined at a vehicle lowermost position among the first to fourth axes S1 to S4, the second axis S2 and the third axis S3 are determined at positions above the fourth axis S4, and the first axis S1 is determined at a position obliquely above the fourth axis S4 on the vehicle front side compared to the fourth axis S4.

Figure 3:
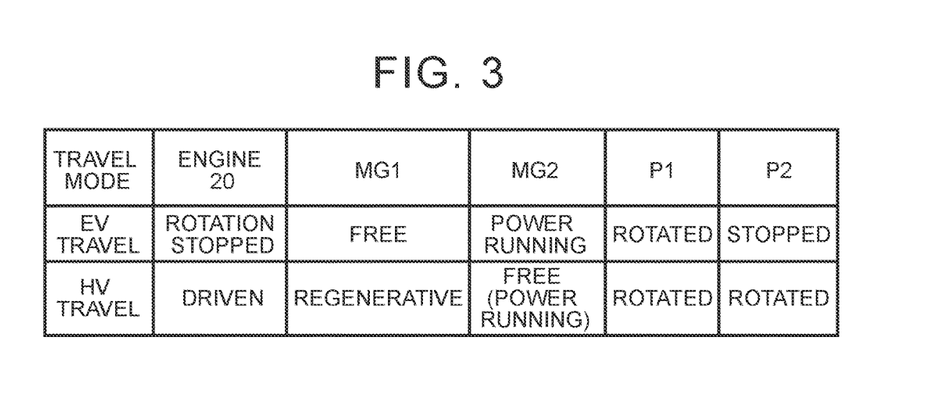
FIG. 3 is a diagram for explaining two kinds of travel modes that can be carried out by the hybrid vehicle of FIG. 1.
Figure 4:
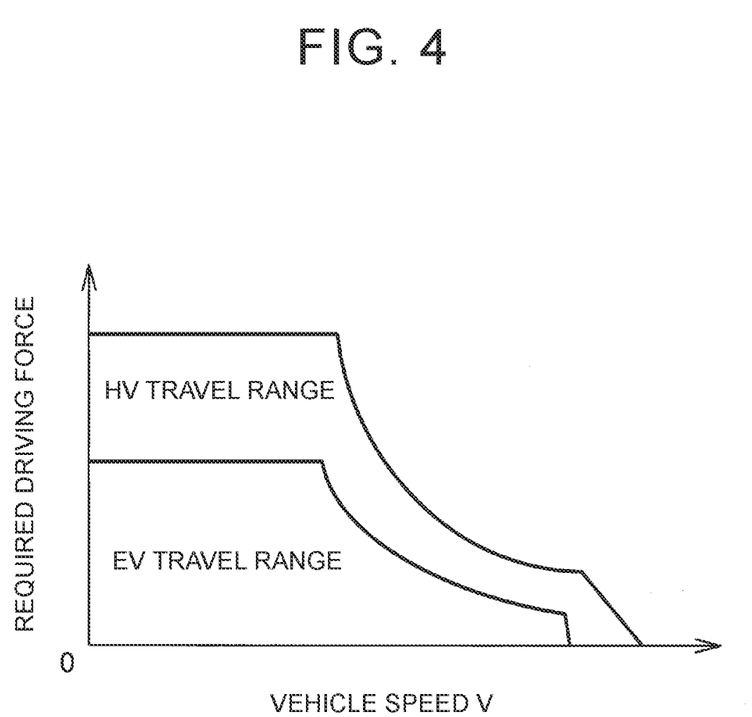
FIG. 4 is a map for explaining one example of travel ranges of the two kinds of travel modes of FIG. 3.

In the hybrid vehicle 10 described above, an EV (Electric Vehicle) travel mode and an HV (Hybrid Vehicle) travel mode shown in FIG. 3 can be carried out. For example, as shown in FIG. 4, the travel mode is switched between the EV travel mode and the HV travel mode according to a mode switching map that is determined using a required driving force (accelerator operation amount or the like) and a vehicle speed V as parameters. The EV travel mode is a mode in which the vehicle travels using the second motor generator MG2 as a driving force source by power-running controlling the second motor generator MG2 in a state where the rotation of the engine 20 is stopped, and is selected in a range of low required driving force, i.e. low load. Fuel supply and so on for the engine 20 are stopped, and the torque of the first motor generator MG1 is set to 0 to allow free rotation of the sun gear 24s of the planetary gear device 24, so that the rotation of the engine 20 is substantially stopped even during the travel of the vehicle. The HV travel mode is a mode in which the vehicle travels using the engine 20 as a driving force source by regeneratively controlling the first motor generator MG1, and is selected in a range of high required driving force (high load) compared to the EV travel mode. In the HV travel mode, the second motor generator MG2 is power-running controlled in an assisting manner at the time of acceleration or the like so as to be used as a driving force source, or is power-running controlled constantly so as to be used as a driving force source.

Instead of the HV travel mode or in addition to the HV travel mode, an engine travel mode or the like in which the vehicle travels constantly using only the engine 20 as a driving force source may be provided. Further, the power transmission device 12 of the hybrid vehicle 10 is only one example and may have various configurations such that a double-pinion type planetary gear device is employed as the planetary gear device 24, that the planetary gear device 24 is constituted by a plurality of planetary gear devices, that the second motor generator MG2 is disposed concentrically with the first axis S1, and that a mechanical transmission device is employed instead of the electric differential portion 26.

Figure 5:
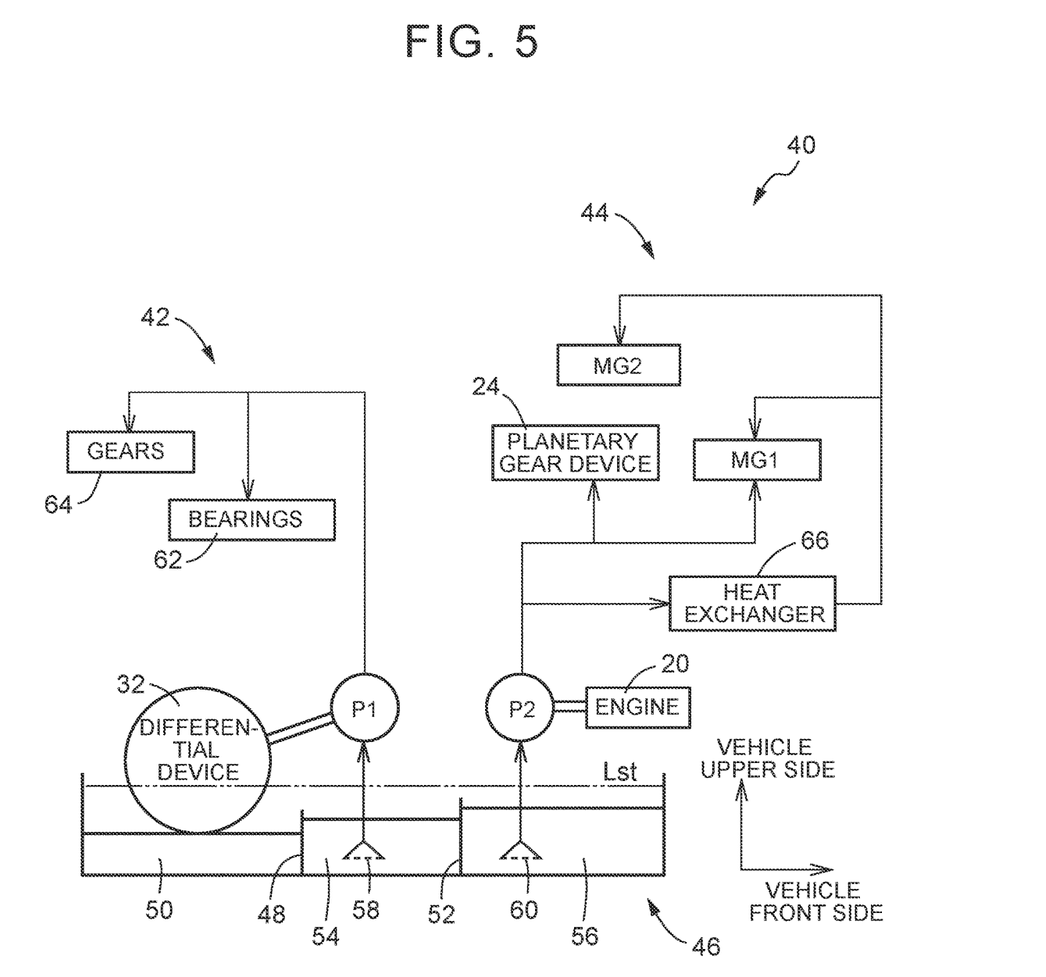
FIG. 5 is a hydraulic circuit diagram for explaining a lubricating device of the first embodiment provided in the hybrid vehicle of FIG. 1.

The hybrid vehicle 10 includes a lubricating device 40 of the first embodiment shown in FIG. 5. The lubricating device 40 includes a first oil pump P1 and a second oil pump P2 as suction devices. The first oil pump P1 and the second oil pump P2 are respectively connected to a first supply route 42 and a second supply route 44 that are different and independent of each other, thereby lubricating the respective portions of the power transmission device 12 in a shared manner. As shown in FIG. 1, the first oil pump P1 is a mechanical oil pump that is mechanically rotationally driven via a pump drive gear Gp meshing with the differential ring gear Gd, while the second oil pump P2 is a mechanical oil pump that is coupled to the input shaft 22 so as to be mechanically rotationally driven by the engine 20. The first oil pump P1 may alternatively be rotationally driven by meshing the pump drive gear Gp with the large-size reduction gear Gr1, the small-size reduction gear Gr2, or the like that co-rotates with the differential ring gear Gd. While the second oil pump P2 is an oil pump that is rotationally driven by a rotary drive source different from the output portion (the differential device 32), and is an oil pump that is rotationally driven by the engine 20 in the first embodiment, it is possible to alternatively employ an electric oil pump that is rotationally driven by a pump-driving electric motor.

The first oil pump P1 and the second oil pump P2 suck lubricating oil from an oil storage portion 46 provided at the bottom of the case 14 and respectively output the lubricating oil to the supply routes 42 and 44. The oil storage portion 46 is constituted by the case 14 itself and has a first oil storage portion 50 that is formed by partitioning a rear side portion in the vehicle longitudinal direction from the other portion by a first partition wall 48. The first oil storage portion 50 is a portion located below the differential device 32 being the output portion. The portion other than the first oil storage portion 50, i.e. the portion located below the first axis S1 on which the planetary gear device 24 and so on are disposed, is further divided into two portions in the vehicle longitudinal direction by a second partition wall 52. Consequently, there is provided a second oil storage portion 54 at a middle portion adjacent to the first oil storage portion 50. Further, there is provided a third oil storage portion 56 at a vehicle front side portion adjacent to the second oil storage portion 54. A suction port 58 of the first oil pump P1 is disposed in the second oil storage portion 54. A suction port 60 of the second oil pump P2 is disposed in the third oil storage portion 56. The suction ports 58 and 60 are respectively connected to the first oil pump P1 and the second oil pump P2 via separate suction oil passages that are provided independently of each other.

The first partition wall 48 and the second partition wall 52 function as circulation restricting portions that restrict equalization of oil levels in the first oil storage portion 50, the second oil storage portion 54, and the third oil storage portion 56 while allowing circulation of the lubricating oil between the first oil storage portion 50, the second oil storage portion 54, and the third oil storage portion 56. That is, a stationary oil level Lst in a stationary state, in which the operations of the first oil pump P1 and the second oil pump P2 are stopped during the stop of the vehicle and therefore the change in oil level is stopped, exceeds the partition walls 48 and 52 as shown by a two-dot chain line in FIGS. 2 and 5 because the lubricating oil supplied to the respective portions of the power transmission device 12 flows down to return to the oil storage portion 46, and consequently, the oil levels in the oil storage portions 50, 54, and 56 are equalized. On the other hand, during the travel of the vehicle and during the operations of the first oil pump P1 and the second oil pump P2, the lubricating oil is supplied to the respective portions of the power transmission device 12 and therefore the amount of the lubricating oil in the oil storage portion 46 decreases, so that the oil levels become lower than upper ends of the partition walls 48 and 52. Then, the oil levels in the oil storage portions 50, 54, and 56 individually change as shown by solid lines due to the circulation restriction by the partition walls 48 and 52. The heights of the partition walls 48 and 52, the suction performances of the first oil pump P1 and the second oil pump P2, the areas of the oil storage portion 46, and so on are determined such that, as described above, the oil level exceeds the partition walls 48 and 52 in the stationary state, while the oil levels become lower than the upper end positions of the partition walls 48 and 52 regardless of the return of the lubricating oil from the lubricating portions when the lubricating oil is supplied during the travel of the vehicle.

The height positions, i.e. the upper end positions, of the first partition wall 48 and the second partition wall 52 are higher than a lower end position of the differential device 32, so that the differential device 32 is partially immersed in the lubricating oil in the stationary state where the oil level exceeds the partition walls 48 and 52. When the differential device 32 is partially immersed in the lubricating oil in this way, the lubricating oil is scraped up by the differential ring gear Gd and so on at the time of start of the vehicle, so that the lubricating oil is scattered to the respective portions of the power transmission device 12. Therefore, it is possible to ensure a good lubrication state even at the time of start of the vehicle at which it is difficult to supply a sufficient amount of the lubricating oil by the first oil pump P1. Normally, at the time of start of the vehicle, the rotation of the engine 20 is stopped in the EV travel mode and therefore the operation of the second oil pump P2 is also stopped.

On the other hand, during the operation of the first oil pump P1 or the second oil pump P2, including during the travel of the vehicle, the oil level is lowered due to the scraping-up of the lubricating oil by the differential ring gear Gd and so on and due to the suction of the lubricating oil by the first oil pump P1 or the second oil pump P2, that rotate according to a vehicle speed V, and becomes lower than the partition wall 48, 52. In the first oil storage portion 50, the oil level is determined by the balance between the scraping-up by the differential ring gear Gd and so on and the return oil amount. In the second oil storage portion 54, the oil level is determined by the balance between the suction of the lubricating oil by the first oil pump P1 and the return oil amount. In the third oil storage portion 56, the oil level is determined by the balance between the suction of the lubricating oil by the second oil pump P2 and the return oil amount. In the first embodiment, the amount of the lubricating oil and the volume of the first oil storage portion 50, i.e. the position of the first partition wall 48, the shape of the first partition wall 48, and so on, are determined such that the oil level in the first oil storage portion 50 is preferentially lowered to be near the lower end of the differential ring gear Gd as shown by the solid line in FIGS. 2 and 5. When the oil level in the first oil storage portion 50 is preferentially lowered in this way, the agitation of the lubricating oil by the rotation of the differential device 32 is suppressed to reduce the energy loss, so that the fuel consumption is improved. Until the oil level becomes equal to or lower than the upper end position of the first partition wall 48, the lubricating oil is supplied by both the scraping-up by the differential ring gear Gd and so on and the suction by at least the first oil pump P1, so that the oil level is rapidly lowered. Therefore, the energy loss due to the agitation of the lubricating oil by the rotation of the differential device 32 is properly reduced.

By properly determining the positions and shapes of the partition walls 48 and 52, the suction performances of the first oil pump P1 and the second oil pump P2, or the like, the oil levels in the second oil storage portion 54 and the third oil storage portion 56 in which the suction ports 58 and 60 are respectively disposed can be made higher than the oil level in the first oil storage portion 50. Consequently, it is possible to suppress air suction of the first oil pump P1 and the second oil pump P2 due to exposure of the suction ports 58 and 60 above the oil surface, so that the lubricating oil can be properly sucked and stably supplied. That is, since the first oil storage portion 50 is partitioned by the first partition wall 48, the oil level in the first oil storage portion 50 where the differential device 32 is disposed can be preferentially lowered while ensuring necessary and sufficient amounts of the lubricating oil on the second oil storage portion 54 side and on the third oil storage portion 56 side. Therefore, the agitation of the lubricating oil by the rotation of the differential device 32 can be suppressed to reduce the energy loss.

In the first embodiment, the second partition wall 52 is provided to define the second oil storage portion 54 and the third oil storage portion 56 in the vehicle longitudinal direction. Since the widths in the vehicle longitudinal direction of the oil storage portions 54 and 56 are small, the bias of the lubricating oil due to a change in posture of the vehicle based on the road surface gradient or the like, acceleration or deceleration, or the like is suppressed, so that the change in oil level decreases. Therefore, air suction of the first oil pump P1 and the second oil pump P2 having the suction ports 58 and 60 disposed in the oil storage portions 54 and 56 is suppressed more properly. Since the suction ports 58 and 60 are separately disposed in the second oil storage portion 54 and the third oil storage portion 56, the lubricating oil is sucked from both the oil storage portions 54 and 56, so that it is possible to ensure a sufficient amount of the lubricating oil. Further, the suction performances of the first oil pump P1 and the second oil pump P2 can be individually set according to required oil supply amounts, return oil amounts to the oil storage portions 54 and 56, and so on, so that, for example, the oil levels can be adjusted so as to prevent air suction. For example, with respect to the first oil pump P1 that is rotationally driven according to a vehicle speed V during the travel of the vehicle, the suction performance may be set to be lower than that of the second oil pump P2 so as to suppress a decrease in oil level, thereby preventing air suction.

While the heights of the first partition wall 48 and the second partition wall 52 may be equal to each other, the height of the second partition wall 52 is set to be higher than that of the first partition wall 48 in the first embodiment. Consequently, when the lubricating oil is supplied by both the scraping-up by the differential ring gear Gd and so on and the suction by at least the first oil pump P1 at the time of start of the vehicle, resulting in that the oil level is lowered to be equal to or lower than the upper end of the second partition wall 52, since the flow of the lubricating oil from the third oil storage portion 56 to the second oil storage portion 54 side is restricted, a decrease in oil level in the second oil storage portion 54 and the first oil storage portion 50 thereafter is promoted, so that the energy loss due to the agitation of the lubricating oil by the rotation of the differential device 32 is rapidly reduced.

The first supply route 42 is connected to the discharge side of the first oil pump P1 and supplies the lubricating oil to the respective portions of the power transmission device 12. Specifically, the first supply route 42 is configured to supply the lubricating oil to bearings 62 and gears 64 (Ge, Gr1, Gr2, Gd, Gm, Gp, etc.) at the respective portions of the power transmission device 12 for lubrication thereof. Since the first oil pump P1 is coupled to the differential device 32 so as to be rotationally driven, the first oil pump P1 is, as shown in FIG. 3, rotationally driven even in the EV travel mode in which the rotation of the engine 20 is stopped, and thus can suck the lubricating oil in a suction amount according to a vehicle speed V and supply the lubricating oil to the respective portions. While the differential device 32 is lubricated by the scraping-up of the lubricating oil by the differential ring gear Gd and so on, it is also possible to lubricate the differential device 32 by supplying the lubricating oil from the first supply route 42. It is also possible to provide an oil storage as needed for stable supply of the lubricating oil, in consideration of a case where, for example, there is a possibility of the occurrence of air suction by the first oil pump P1.

The second supply route 44 connected to the discharge side of the second oil pump P2 supplies the lubricating oil to the input shaft 22, the planetary gear device 24, and the first motor generator MG1 located above the second oil storage portion 54 and the third oil storage portion 56 for lubrication and cooling thereof. The second supply route 44 is provided with a heat exchanger 66, so that the lubricating oil is cooled and supplied to the first motor generator MG1 and the second motor generator MG2, thereby cooling them to prevent overheating thereof. The heat exchanger 66 is an oil cooler that cools the lubricating oil by heat exchange, for example, by air cooling or water cooling. Since the engine 20 that rotationally drives the second oil pump P2 can be driven even during the stop of the vehicle, the second oil pump P2 can suck the lubricating oil in a suction amount not depending on a vehicle speed V, including during the stop of the vehicle, and supply the lubricating oil to the lubricating portions, but, in the EV travel mode, the operation of the second oil pump P2 is stopped due to the stop of the rotation of the engine 20 as shown in FIG. 3.

As described above, the lubricating device 40 of the hybrid vehicle 10 includes the first oil pump P1 that is coupled to the differential device 32 being the output portion so as to be mechanically rotationally driven. Therefore, even in the EV travel mode in which the rotation of the engine 20 is stopped due to free rotation of the first motor generator MG1, the lubricating oil is sucked from the second oil storage portion 54 by the first oil pump P1 according to a vehicle speed V. Therefore, the lubricating oil is supplied to the lubricating portions such as the bearings 62 and the gears 64, so that proper lubrication is carried out. Even in the EV travel mode, since the sun gear 24s and the ring gear 24r of the planetary gear device 24 are idled and the second motor generator MG2 is power-running controlled, it may alternatively be configured that the lubricating oil is supplied from the first supply route 42 to the planetary gear device 24 and the second motor generator MG2.

The stationary oil level Lst in the stationary state such as during the stop of the vehicle in which the first oil pump P1 and the second oil pump P2 are stopped is higher than the first partition wall 48, so that the differential device 32 being the output portion is at least partially immersed in the lubricating oil. Therefore, the lubricating oil is scraped up by the rotation of the differential ring gear Gd and so on at the time of start of the vehicle, so that the lubricating oil is scattered to the respective portions of the power transmission device 12. Consequently, it is possible to ensure a good lubrication state even at the time of start of the vehicle at which it is difficult to supply a sufficient amount of the lubricating oil by the first oil pump P1.

On the other hand, during the travel of the vehicle, the oil level of the lubricating oil is lowered due to the suction by at least the first oil pump P1 and the scraping-up by the rotation of the differential ring gear Gd and so on. Then, when the oil level becomes equal to or lower than the upper end of the first partition wall 48, the lubricating oil in the second oil storage portion 54 is sucked by the first oil pump P1, and the oil level in the first oil storage portion 50 is further lowered due to the scraping-up by the rotation of the differential ring gear Gd and so on, so that the oil level in the first oil storage portion 50 is located below the upper end position of the first partition wall 48 regardless of the return of the lubricating oil from the lubricating portions. Therefore, the mechanical energy loss due to the agitation of the lubricating oil by the rotation of the differential device 32 is reduced. In particular, until the oil level becomes equal to or lower than the upper end of the first partition wall 48, the oil level is lowered due to both the suction by the first oil pump P1 and the scraping-up by the rotation of the differential ring gear Gd and so on, and therefore, a region, that is immersed in the lubricating oil, of the differential device 32 rapidly becomes smaller, so that the energy loss due to the agitation of the lubricating oil is properly reduced.

Since the suction port 58 of the first oil pump P1 is disposed in the second oil storage portion 54 that is adjacent to the first oil storage portion 50, the oil level in the second oil storage portion 54 during the travel of the vehicle can be adjusted independently of that in the first oil storage portion 50 by the suction performance of the first oil pump P1, the range of the second oil storage portion 54, i.e. the positions and shapes of the partition walls 48 and 52, and so on. Consequently, the oil level in the second oil storage portion 54 can be adjusted so as to suppress air suction of the first oil pump P1, so that it is possible to properly prevent short supply of the lubricating oil due to air suction, thereby stably supplying the lubricating oil.

Since the second oil pump P2 that is rotationally driven by the engine 20 is provided separately from the first oil pump P1, it is possible to compensate for shortage of the lubricating oil supply amount. Further, it is possible to lubricate the respective portions in a lubricating oil supply amount not depending on a vehicle speed V. Since the suction port 60 of the second oil pump P2 is disposed in the third oil storage portion 56, it is possible to prevent air suction and thus to stably supply the lubricating oil by setting the suction performance and so on so as to prevent the occurrence of air suction of the second oil pump P2.

Since the first partition wall 48 and the second partition wall 52 are provided in the oil storage portion 46 to define the first oil storage portion 50, the second oil storage portion 54, and the third oil storage portion 56 from one end side in the vehicle longitudinal direction, the widths in the vehicle longitudinal direction of the second oil storage portion 54 and the third oil storage portion 56, in which the suction ports 58 and 60 are disposed, are shortened. Consequently, the bias of the lubricating oil due to a change in posture of the vehicle based on the road surface gradient or the like, acceleration or deceleration, or the like is suppressed, so that the change in oil level decreases. Therefore, air suction of the first oil pump P1 and the second oil pump P2 is suppressed more properly. Since the suction ports 58 and 60 are separately disposed in the second oil storage portion 54 and the third oil storage portion 56, the lubricating oil is sucked from both the oil storage portions 54 and 56, so that it is possible to ensure a sufficient amount of the lubricating oil. Further, the suction performances of the first oil pump P1 and the second oil pump P2 can be individually set according to required oil supply amounts, return oil amounts to the oil storage portions 54 and 56, and so on, so that, for example, the oil levels can be adjusted so as to prevent the occurrence of air suction.

Since the height of the second partition wall 52 is higher than that of the first partition wall 48 and the suction port 58 of the first oil pump P1 is disposed in the second oil storage portion 54, the oil level of the lubricating oil is lowered due to the scraping-up by the rotation of the differential ring gear Gd and so on and the suction by at least the first oil pump P1 at the time of start of the vehicle. When the oil level is lowered to be equal to or lower than the upper end of the second partition wall 52, the flow of the lubricating oil from the third oil storage portion 56 to the second oil storage portion 54 side is restricted. Therefore, a decrease in oil level in the second oil storage portion 54 and the first oil storage portion 50 thereafter is promoted, so that the energy loss due to the agitation of the lubricating oil by the rotation of the differential device 32 is rapidly reduced.

Since the oil pump using the engine 20 as its rotary drive source is used as the second oil pump P2, complicated control is unnecessary and it is advantageous in cost and so on compared to a case where an electric oil pump that is rotationally driven by an electric motor for a pump is employed.

Since the first supply route 42 and the second supply route 44 are configured independently of each other, a switching valve or the like is unnecessary and therefore the structure can be simplified. Further, the suction performances of the first oil pump P1 and the second oil pump P2 can be individually set according to required oil amounts that are different for the respective supply routes 42 and 44, so that it is possible to suppress unnecessary supply of the lubricating oil. In addition, since the supply routes 42 and 44 are individually determined, the lubrication performances and so on can be properly set for the respective supply routes 42 and 44 such that, for example, it is possible to separately provide the heat exchanger 66 such as an oil cooler, or an oil storage that stores the lubricating oil. That is, in the first supply route 42, it is not necessarily required to cool the lubricating oil and thus a heat exchanger is omitted, and therefore, the viscosity of the lubricating oil can be kept at a certain value or less, so that the loss due to the viscosity is reduced. Further, since the viscosity is low, the pressure resistance requirements for the first supply route 42 are relaxed.

Since the separate suction ports 58 and 60 are provided to the first oil pump P1 and the second oil pump P2 via the separate suction oil passages independently of each other, the arrangements and meshes of the suction ports 58 and 60 can be individually set according to suction amounts of the first oil pump P1 and the second oil pump P2, lubricating portions by the supply routes 42 and 44, and so on. For example, it is desirable that the mesh of a strainer of the suction port 60 of the second oil pump P2, to which the lubricating oil is supplied via the heat exchanger 66, be fine.

Next, other embodiments of the present disclosure will be described. In the following embodiments, portions that are substantially common to the first embodiment will be assigned the same reference symbols as those in the first embodiment, thereby omitting a detailed description thereof.

Figure 6:
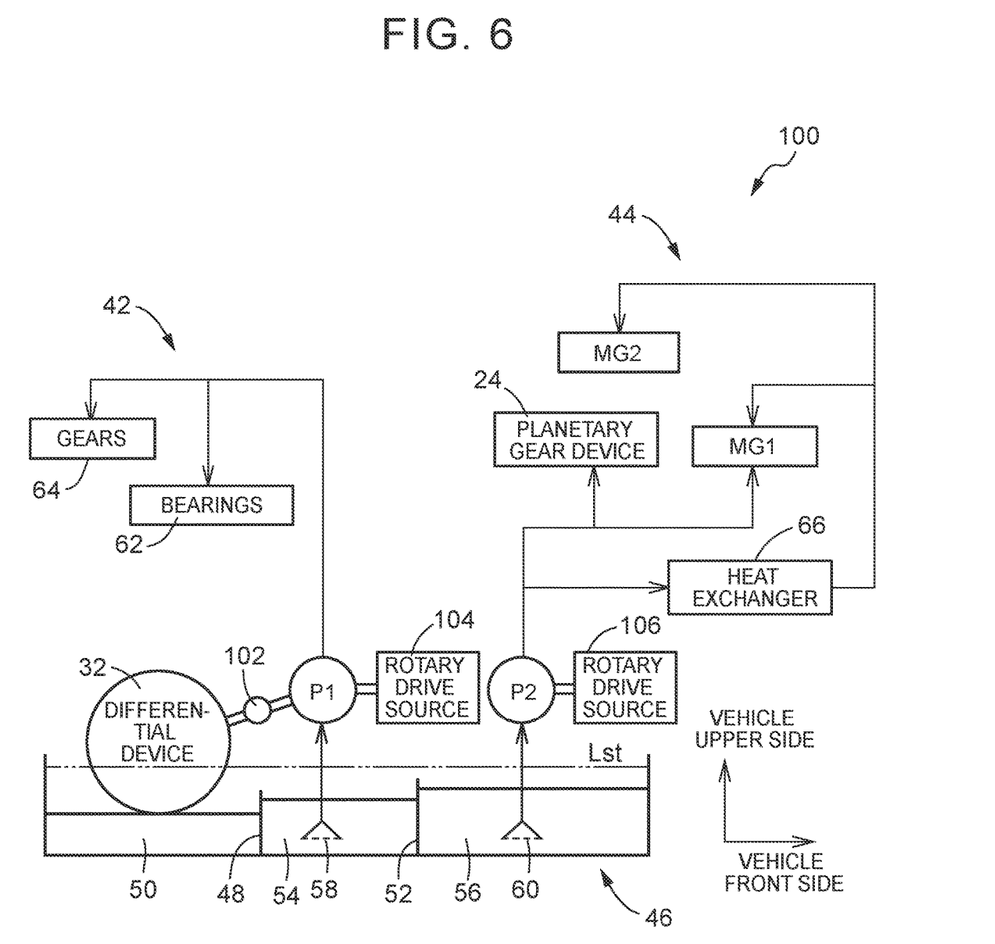
FIG. 6 is a hydraulic circuit diagram for explaining a lubricating device of a second embodiment provided in the hybrid vehicle of FIG. 1.

First, a second embodiment of the present disclosure will be described. A lubricating device 100 of FIG. 6 is configured such that a first oil pump P1 is coupled to a differential device 32 via a pump connecting/disconnecting device 102 that connects/disconnects power transmission, and is coupled to another rotary drive source 104 so as to be rotationally driven. The pump connecting/disconnecting device 102 is a clutch, a one-way clutch, or the like and is disposed between the first oil pump P1 and a pump drive gear Gp. While a pump-driving electric motor, for example, is preferably used as the other rotary drive source 104, the first oil pump P1 may alternatively be rotationally driven mechanically by the engine 20. In this case, the first oil pump P1 may be coupled to the engine 20 via a second pump connecting/disconnecting device such as a clutch or a one-way clutch. In this case, the first oil pump P1 can be driven at a rotational speed not depending on a vehicle speed V, including during the stop of the vehicle, so that lubricating oil can be supplied to lubricating portions of respective portions from a first supply route 42.

In the lubricating device 100, a second oil pump P2 is also rotationally driven by a predetermined rotary drive source 106. While the rotary drive source 106 may be the engine 20 as in the lubricating device 40, a pump-driving electric motor may alternatively be provided newly.

Figure 7:
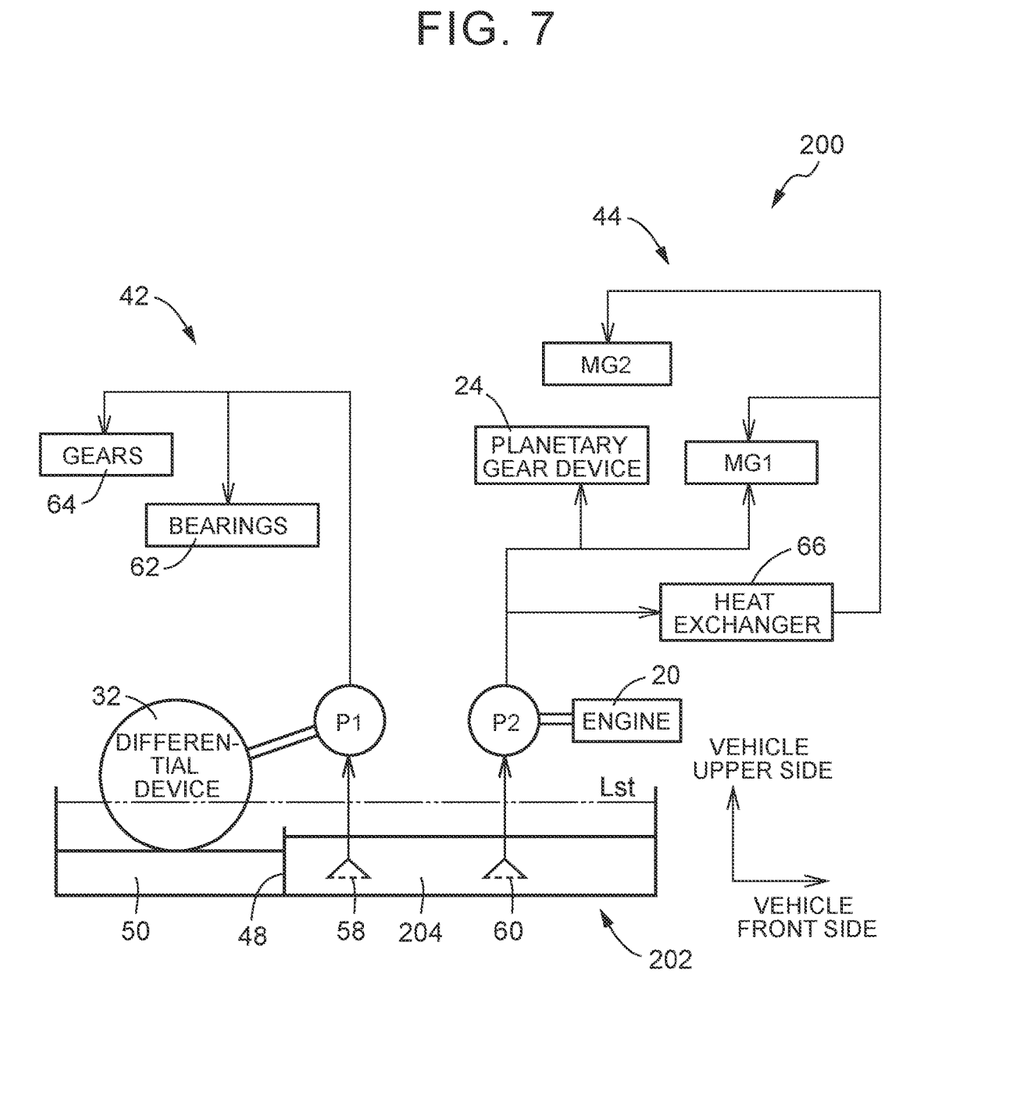
FIG. 7 is a hydraulic circuit diagram for explaining a lubricating device of a third embodiment provided in the hybrid vehicle of FIG. 1.

Next, a third embodiment of the present disclosure will be described. A lubricating device 200 of FIG. 7 differs in an oil storage portion 202 compared to the lubricating device 40 described above. In the oil storage portion 202, the second partition wall 52 is omitted, a single second oil storage portion 204 is provided adjacent to a first oil storage portion 50 via a first partition wall 48 interposed therebetween, and suction ports 58 and 60 of a first oil pump P1 and a second oil pump P2 are disposed in the common second oil storage portion 204. In this case, while the action and effect by the second partition wall 52 are not obtained, since the first oil storage portion 50 is partitioned by the first partition wall 48, the oil level in the first oil storage portion 50 where a differential device 32 is disposed is preferentially lowered due to scraping-up of lubricating oil by the rotation of a differential ring gear Gd and so on while ensuring a sufficient amount of the lubricating oil necessary for stable supply of the lubricating oil by the first oil pump P1 and the second oil pump P2 on the second oil storage portion 204 side, so that the agitation of the lubricating oil by the rotation of the differential device 32 can be suppressed to reduce the energy loss. Also in the second embodiment, the action and effect similar to those in the first embodiment are obtained.

Figure 8:
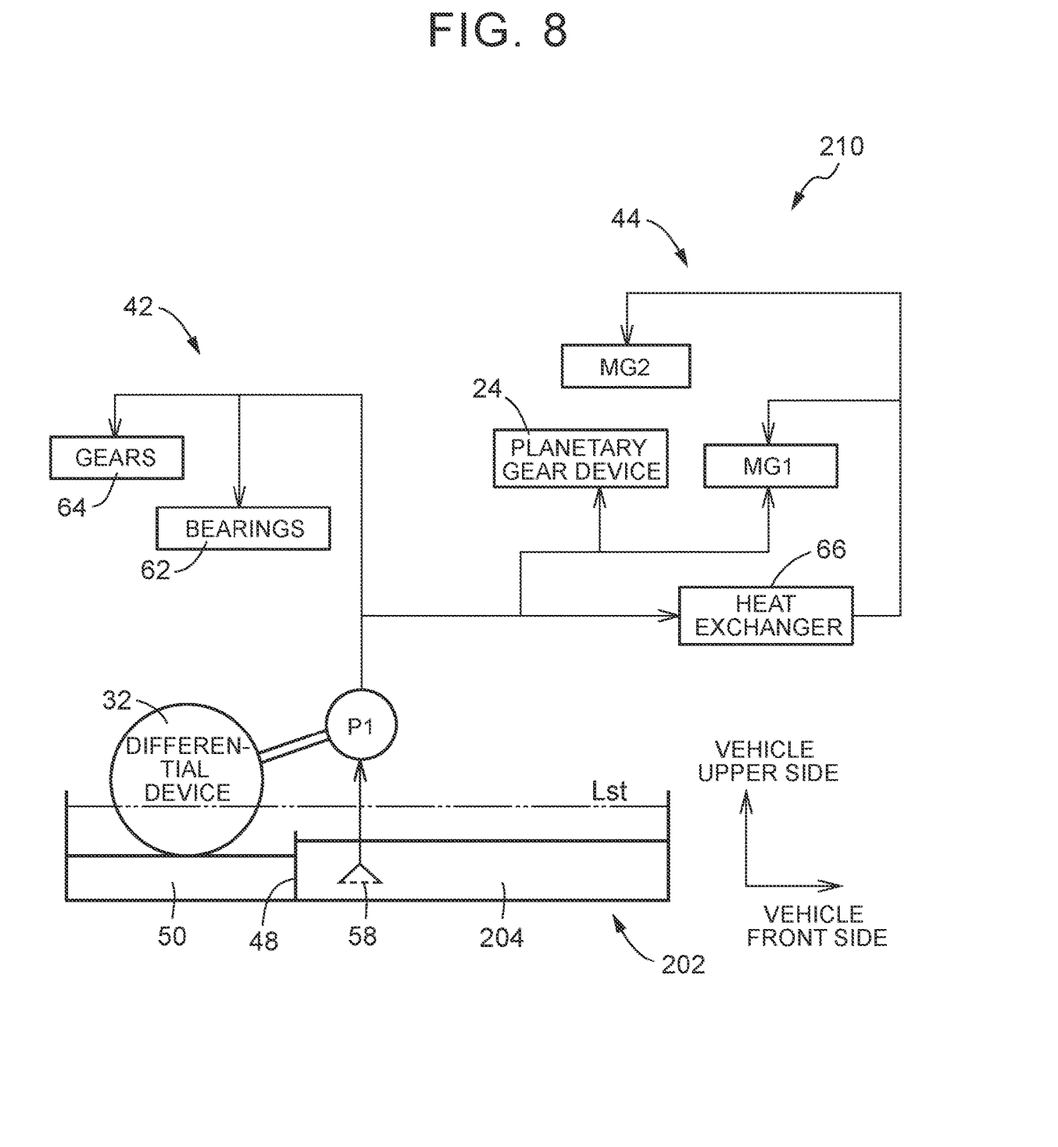
FIG. 8 is a hydraulic circuit diagram for explaining a lubricating device of a fourth embodiment provided in the hybrid vehicle of FIG. 1.

Next, a fourth embodiment of the present disclosure will be described. A lubricating device 210 of FIG. 8 is configured such that the second oil pump P2 is omitted in the lubricating device 200 described above, that a second supply route 44 is connected to a first supply route 42, and that lubricating oil is supplied also to the second supply route 44 from a first oil pump P1.

Figure 9:
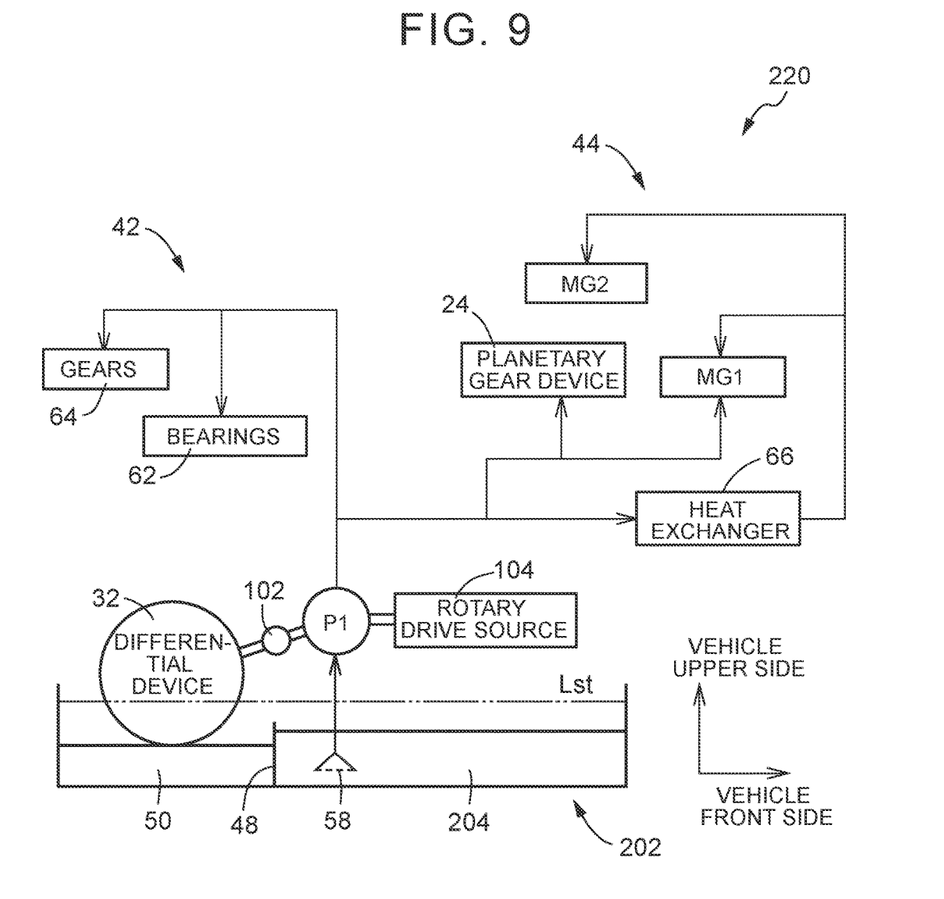
FIG. 9 is a hydraulic circuit diagram for explaining a lubricating device of a fifth embodiment provided in the hybrid vehicle of FIG. 1.

Next, a fifth embodiment of the present disclosure will be described. A lubricating device 220 of FIG. 9 differs in a drive structure for a first oil pump P1 compared to the lubricating device 210 described above. That is, as in the lubricating device 100 of FIG. 6, the first oil pump P1 in this embodiment is coupled to a differential device 32 via a pump connecting/disconnecting device 102 and is coupled to another rotary drive source 104 so as to be rotationally driven, so that it is possible to lubricate respective portions in a lubricating oil supply amount not depending on a vehicle speed V, including during the stop of the vehicle.

Figure 10:
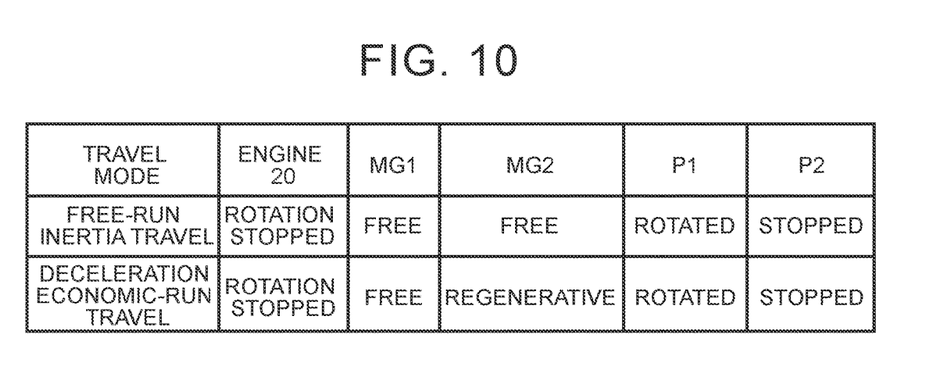
FIG. 10 is a diagram for explaining other travel modes that can be carried out by the hybrid vehicle of FIG. 1.

FIG. 10 is a diagram for explaining other travel modes that can be carried out by the hybrid vehicle 10. In a free-run inertia travel mode, fuel supply and so on for the engine 20 are stopped, and the torque of the first motor generator MG1 and the torque of the second motor generator MG2 are both set to 0 to allow free rotation, so that the rotation of the engine 20 is stopped and that the vehicle travels by inertia with no engine braking. The free-run inertia travel mode is carried out in either of the EV travel mode and the HV travel mode, for example, at the time of accelerator-off, i.e. when depression of an accelerator pedal is released. In a deceleration economic-run travel mode, fuel supply and so on for the engine 20 are stopped, and the torque of the first motor generator MG1 is set to 0 to allow free rotation, so that the rotation of the engine 20 is stopped, while the second motor generator MG2 is regeneratively controlled to generate braking torque on the vehicle. The deceleration economic-run travel mode is carried out in either of the EV travel mode and the HV travel mode, for example, at the time of brake-on deceleration, i.e. when a brake pedal is depressed.

In either of the free-run inertia travel mode and the deceleration economic-run travel mode, while the rotation of the engine 20 is stopped, the first oil pump P1 coupled to the differential device 32 is rotationally driven according to a vehicle speed V, and therefore, the respective portions of the power transmission device 12 are lubricated by the lubricating oil supplied from the first oil pump P1. The oil level in the first oil storage portion 50 is lowered due to the suction of the lubricating oil by the first oil pump P1 and the scraping-up of the lubricating oil by the rotation of the differential ring gear Gd and so on, and the energy loss due to the agitation of the lubricating oil by the rotation of the differential device 32 is suppressed, so that the action and effect similar to those in the respective embodiments described above are obtained. Specifically, in the free-run inertia travel mode, the travel distance of the inertia travel increases by the suppression of the energy loss due to the agitation of the lubricating oil, while, in the deceleration economic-run travel mode, the amount of electric power generation by the regenerative control of the second motor generator MG2 increases by the suppression of the energy loss due to the agitation of the lubricating oil.

Figure 11:
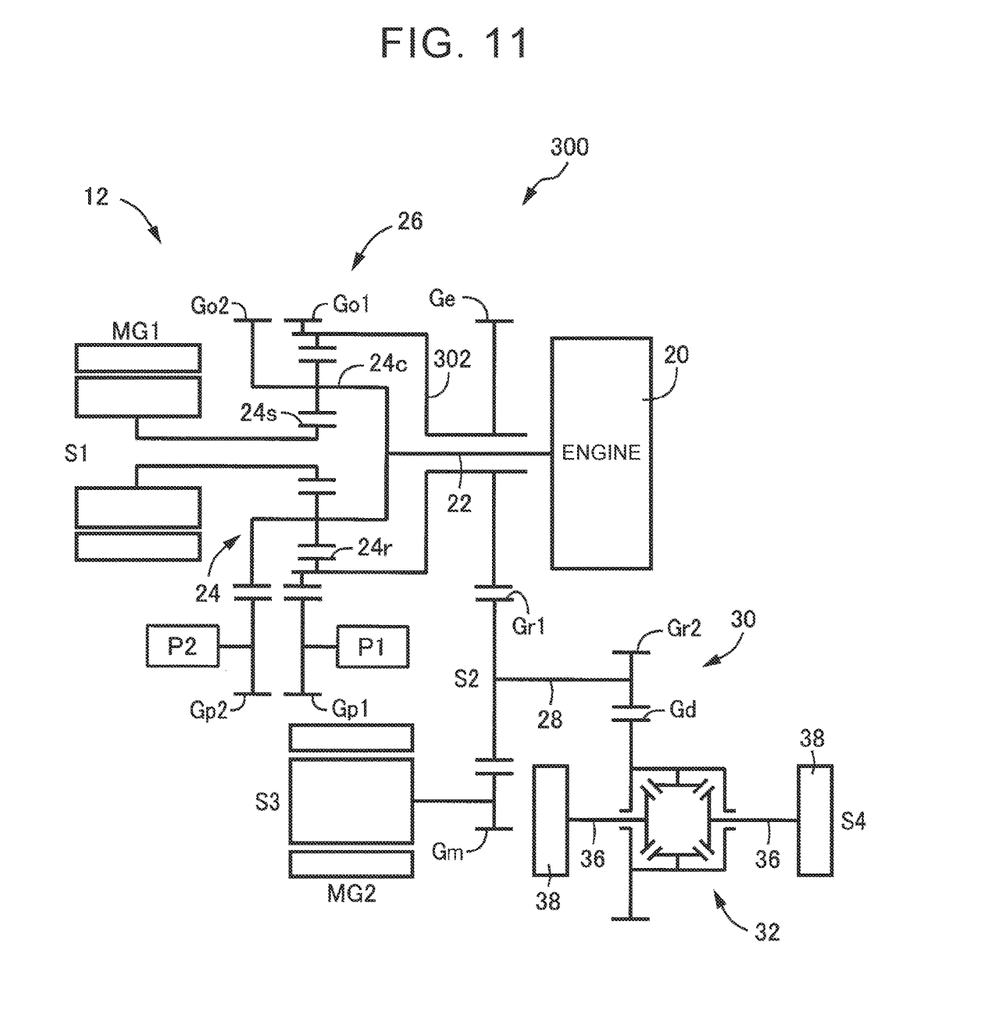
FIG. 11 is a skeleton diagram, corresponding to FIG. 1, for explaining a hybrid vehicle having a different mechanical coupling structure of a pair of oil pumps.

A hybrid vehicle 300 of FIG. 11 differs in a structure for rotationally driving a first oil pump P1 and a second oil pump P2 mechanically, compared to the hybrid vehicle 10. That is, the first oil pump P1 is rotationally driven via a pump drive gear Gp1 by a branch gear Go1 that is integrally provided to a ring gear 24r of a planetary gear device 24. An engine output gear Ge is integrally provided to the ring gear 24r via a coupling member 302 and is mechanically coupled to a differential device 32 via a large-size reduction gear Gr1 and so on in a power transmittable manner. The second oil pump P2 is rotationally driven via a pump drive gear Gp2 by a branch gear Go2 that is integrally provided to a carrier 24c of the planetary gear device 24. The carrier 24c is integrally coupled to an input shaft 22 so as to be rotationally driven mechanically by the rotation of an engine 20. Therefore, also in the hybrid vehicle 300, the lubricating device 40, 200 is suitably provided and, by providing the pump connecting/disconnecting device 102 and the rotary drive source 104, 106 or omitting the second oil pump P2, it is possible to use any of the lubricating devices 100, 210, and 220 shown in FIGS. 6, 8, and 9. Similar actions and effects are obtained.

While the embodiments of the present disclosure have been described in detail with reference to the drawings, these are by way of example only, and the present disclosure can be carried out in various modes added with changes or improvements based on the knowledge of those skilled in the art.

What is claimed is:

1. A lubricating device of a power transmission device for a vehicle, the lubricating device comprising:
    an oil storage portion provided at a bottom portion in a case of the power transmission device configured to transmit a driving force from a driving force source of the vehicle to a drive wheel of the vehicle, the oil storage portion being configured to store lubricating oil, and the oil storage portion including a first oil storage portion and an oil storage portion other than the first oil storage portion defined by a first partition wall, the first oil storage portion being located below an output portion of the power transmission device; and
    a suction device configured to suck the lubricating oil and to supply the lubricating oil to respective portions of the power transmission device, the suction device including a first oil pump configured to be rotationally driven mechanically by rotation of the output portion and to suck the lubricating oil,
    wherein
    (i) a height of the first partition wall is set to be lower than a stationary oil level of the lubricating oil in a stationary state in which flow of the lubricating oil is stopped,
    (ii) a height position of a lower end of the output portion is lower than an upper end position of the first partition wall, and the output portion is at least partially immersed in the lubricating oil in the stationary state,
    (iii) a suction port of the first oil pump is disposed in the oil storage portion other than the first oil storage portion in the oil storage portion, and
    (iv) during travel of the vehicle, an oil level in the first oil storage portion is caused to be located below the upper end position of the first partition wall, by a fact that the lubricating oil in the first oil storage portion is scraped up by the rotation of the output portion, and the lubricating oil in the oil storage portion other than the first oil storage portion is sucked by the first oil pump.

2. The lubricating device according to claim 1, wherein the suction device includes a second oil pump separately from the first oil pump, the second oil pump is configured to be rotationally driven by a rotary drive source that is different from the output portion, and a suction port of the second oil pump is disposed in the oil storage portion other than the first oil storage portion in the oil storage portion.

3. The lubricating device according to claim 2, wherein the oil storage portion is defined by the first partition wall so as to provide the first oil storage portion and the oil storage portion is provided with a second partition wall that further defines the oil storage portion other than the first oil storage portion, the oil storage portion other than the first oil storage portion has a second oil storage portion adjacent to the first oil storage portion and a third oil storage portion adjacent to the second oil storage portion, and the suction port of the first oil pump and the suction port of the second oil pump are separately disposed in one and the other of the second oil storage portion and the third oil storage portion.

4. The lubricating device according to claim 3, wherein a height of the second partition wall is set to be higher than the height of the first partition wall, the suction port of the first oil pump is disposed in the second oil storage portion, and the suction port of the second oil pump is disposed in the third oil storage portion.

* * * * *